United States Patent
Hayata et al.

[11] Patent Number: 5,077,163
[45] Date of Patent: Dec. 31, 1991

[54] ELECTROPHOTOGRAPHIC PHOTORECEPTOR

[75] Inventors: Hirofumi Hayata; Osamu Sasaki; Shinichi Suzuki, all of Hino, Japan

[73] Assignee: Konica Corporation, Tokyo, Japan

[21] Appl. No.: 530,594

[22] Filed: May 30, 1990

[30] Foreign Application Priority Data

May 31, 1989 [JP] Japan .................................. 1-139605

[51] Int. Cl.5 ........................ G03G 15/02; G03G 5/00; G03G 15/06
[52] U.S. Cl. ....................................... 430/59; 430/70; 430/73
[58] Field of Search .............................. 430/59, 70, 73

[56] References Cited

PUBLICATIONS

Malkes et al., Chem. Abstracts 84(25): 179777t from Zh. Prilk. Spektrosk. 24(3)541.

Primary Examiner—Marion E. Mc Camish
Assistant Examiner—S. Crossan
Attorney, Agent, or Firm—Finnegan, Henderson, Farabow, Garrett, and Dunner

[57] ABSTRACT

An electrophotographic photoreceptor having a layer that contain at least one compound represented by the following general formula (I):

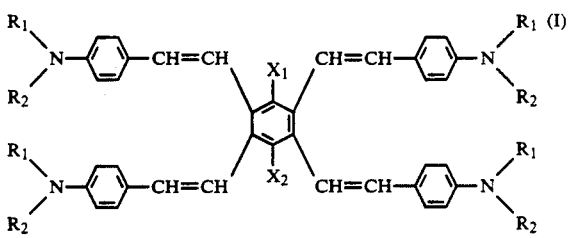

where $R_1$ and $R_2$ each represents an optionally substituted alkyl, aralkyl, aryl or heterocyclic group, provided that $R_1$ and $R_2$ may combine to form a cyclic amino group containing a nitrogen atom; $X_1$ and $X_2$ each represents a hydrogen atom, a hydroxyl group, a lower alkyl group having 1-5 carbon atoms, a lower alkoxy group having 1-5 carbon atoms, a halogen atom, an allyl group, an aryl group or an acylamino group.

15 Claims, 1 Drawing Sheet

ELECTROPHOTOGRAPHIC PHOTORECEPTOR

BACKGROUND OF THE INVENTION

This invention relates to an electrophotographic photoreceptor, particularly to one having a light-sensitive layer containing both a carrier generation material and a carrier transport material.

Electrophotographic photoreceptors have been known extensively that have light-sensitive layers chiefly composed of inorganic photoconductors such as selenium, zinc oxide, cadmium sulfide and silicon. However, these photoreceptors have not necessarily been satisfactory in such characteristics as heat stability and durability. They also have had problems in connection with handling in manufacture.

On the other hand, photoreceptors having light-sensitive layers chiefly composed of organic photoconductive compounds have many advantages such as relative ease in manufacture, low cost and easy handling. Further, they are usually more heat-resistant than photoreceptors using inorganic selenium as a photoconductive material. Among various organic photoconductive compounds used today, poly-N-vinylcarbazoe is best known and photoreceptors having light-sensitive layers chiefly composed of charge transfer complexes formed of this compound and Lewis acids such as 2,4,7-trinitro-9-fluorenone are already in commercial use.

A proposal has also been made that different materials be used to fulfill the two principal functions of photoconductors, i.e., carrier generation and carrier transport, and photoreceptors of such a "functionally separated" type are known to incorporate carrier generation and transport materials either in superposed layers or in a single layer. As an extension of this approach, a photoreceptor having a light-sensitive layer composed of a carrier generation layer in the form of a thin amorphous selenium layer and a carrier transport layer containing poly-N-vinylcarbazole as a chief component is already in commercial use.

However, poly-N-vinylcarbazole is inflexible and its film is so rigid and brittle that it will easily crack or separate from the substrate. Thus, photoreceptors using this compound as a photoconductive material do not have high endurance. If one attempts to solve this problem by adding plasticizers, high residual potential will develop in electrophotographic processing and during cyclic use, the residual potential builds up to cause increased fogging until the copy image is substantially impaired.

Low-molecular weight organic photoconductive compounds usually do not have a film forming ability and hence are used in combination with suitable binders. This practice is preferred in that the physical properties or sensitivite characteristics of the photoconductive film can be controlled to some extent by properly selecting such factors as the type of binder used and its compositional ratio. However, the types of organic photoconductive compounds that are highly miscible with binders are limited and there are not many binders available that can be used to construct light-sensitive layers in photoreceptors, particularly in electrophotographic photoreceptors. For example, the 2,5-bis(p-diethylaminophenyl)-1,3,4-oxadiazole described in U.S. Pat. No. 3,189,447 has only low miscibility with binders such as polyesters and polycarbonates that are commonly used in the light-sensitive layers of electrophotographic photoreceptors. If this compound is used in the amount necessary to provide desired electrophotographic characteristics, oxadiazole will start to crystallize at 50° C. and above to impair the electrophotographic characteristics such as charge retention and sensitivity.

On the other hand, the diarylalkane derivatives described in U.S. Pat. No. 3,820,989 are comparatively satisfactory in terms of miscibility with binders. However, they are not highly lightfast and if they are used in the light-sensitive layer of a photoreceptor that is to be subjected to cyclic transfer electrophotography where charging and exposure are repeatedly performed, the sensitivity of the photoreceptor will gradually deteriorate.

U.S. Pat. No. 3,274,000 and JP-B-47-36428 (the term "JP-B" as used herein means an "examined Japanese patent publication") describe different types of phenothiazine derivatives but each of them has low sensitivity to light and its performance will deteriorate during cyclic use.

The stilbene compounds described in JP-A-58-65440 and JP-A-58-190953 (the term "JP-A" as used herein means an "unexamined published Japanese patent application") are comparatively satisfactory in terms of charge retention and sensitivity but their endurance is not so good as to withstand cyclic use. The bisstilbene compounds described in JP-B-53 87227 do not have high solubility and their miscibility with binders is low.

Thus, none of the carrier transport materials discovered to date have characteristics that should be satisfied in order to fabricate practically acceptable electrophotographic photoreceptors.

SUMMARY OF THE INVENTION

An object, therefore, of the present invention is to provide a photoreceptor of high sensitivity.

Another object of the present invention is to provide an electrophotographic photoreceptor that has high sensitivity and which yet produces low residual potential.

A further object of the present invention is to provide an electrophotographic photoreceptor that will experience less deterioration due to fatigue during repeated use when it is subjected to cyclic transfer electrophotography and that has sufficient endurance to exhibit consistent characteristics for a prolonged period.

As a result of the intensive studies conducted in order to attain these objects, it has been found that an electrophotographic photoreceptor containing at least one compound represented by the following general formula (I) has excellent utility:

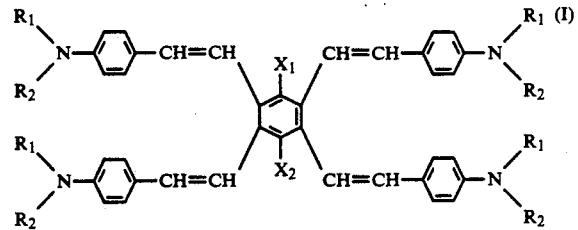

where $R_1$ and $R_2$ each represents an optionally substituted alkyl, aralkyl, aryl or heterocyclic group, provided that $R_1$ and $R_2$ may combine to form a cyclic amino group containing a nitrogen atom; $X_1$ and $X_2$ each represents a hydrogen atom, a hydroxyl group, a lower alkyl group having 1-5 carbon atoms, a lower alkoxy group having 1-5 carbon atoms, a halogen atom, an allyl group, an aryl group or an acylamino group.

DETAILED DESCRIPTION OF THE INVENTION

Figure 1:
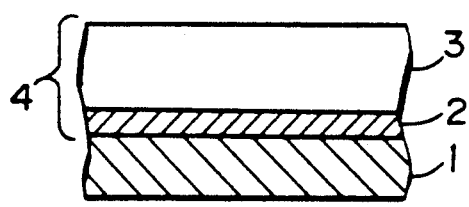
FIGS. 1 to 6 are partially enlarged sectional views of electrophotographic photoreceptors having different layer arrangements.
Figure 2:
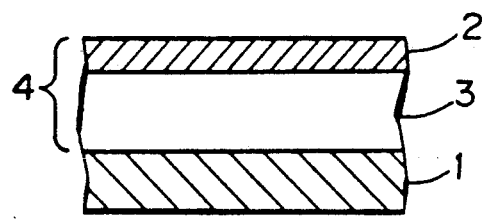

Examples of the alkyl group represented by $R_1$ and $R_2$ are methyl, ethyl, propyl and butyl; examples of the aryl group represented by $R_1$ and $R_2$ are phenyl and naphthyl; examples of the aralkyl group represented by $R_1$ and $R_2$ are benzyl and phenethyl; and examples of the heterocyclic group represented by $R_1$ and $R_2$ are furyl, thienyl and quinolyl. It should be mentioned that $R_1$ and $R_2$ may have substituents and preferred substituents are an alkyl group such as methyl, ethyl or iso-propyl, an alkoxy group such as methoxy or ethoxy, and a halogen atom such as a fluorine, chlorine, bromine or iodine atom.

Examples of the lower alkyl group represented by $X_1$ and $X_2$ are methyl, ethyl and propyl; examples of the halogen atom represented by $X_1$ and $X_2$ are a fluorine atom, a chlorine atom, a bromine atom and an iodine atom; and examples of the lower alkoxy group represented by $X_1$ and $X_2$ are methoxy and ethoxy.

Specific examples of the compound represented by the general formula (I) in accordance with the present invention are listed below:

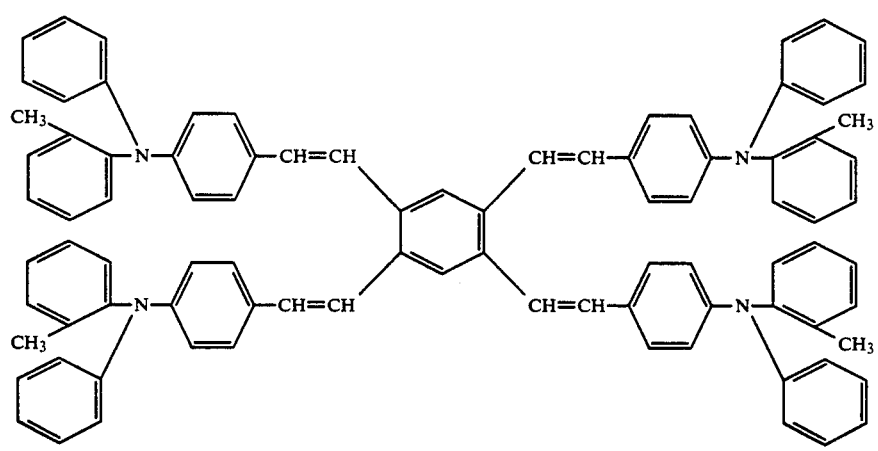

(1)

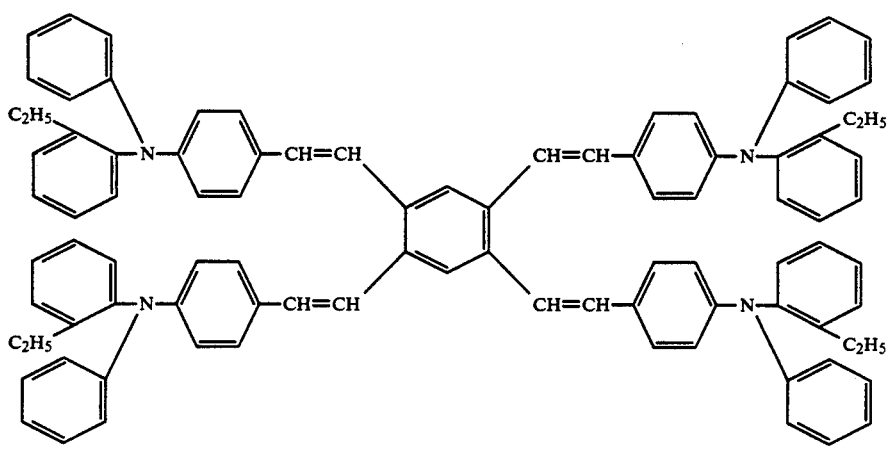

(2)

-continued
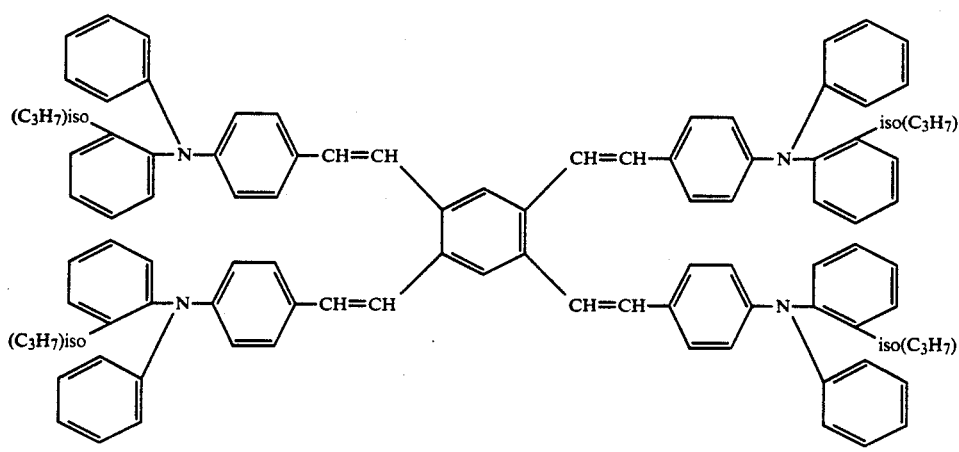
(3)
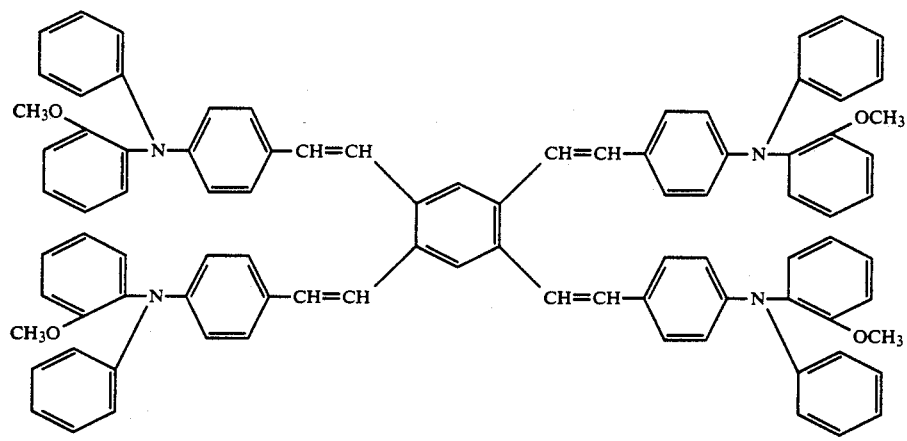
(4)
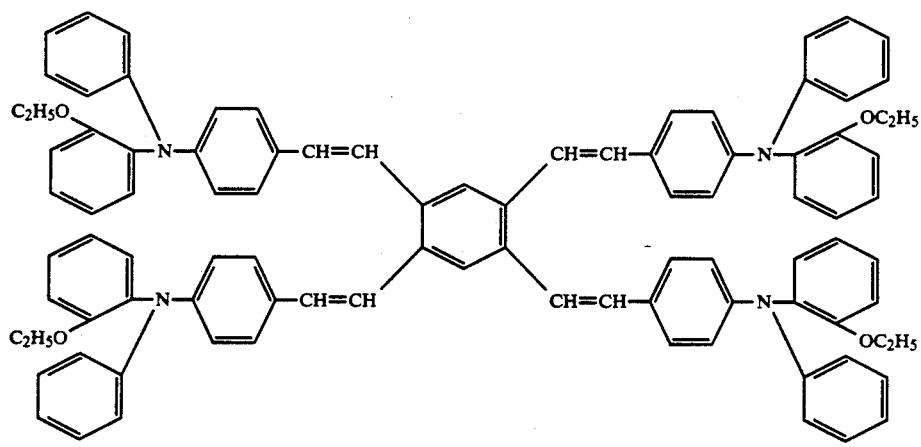
(5)

-continued
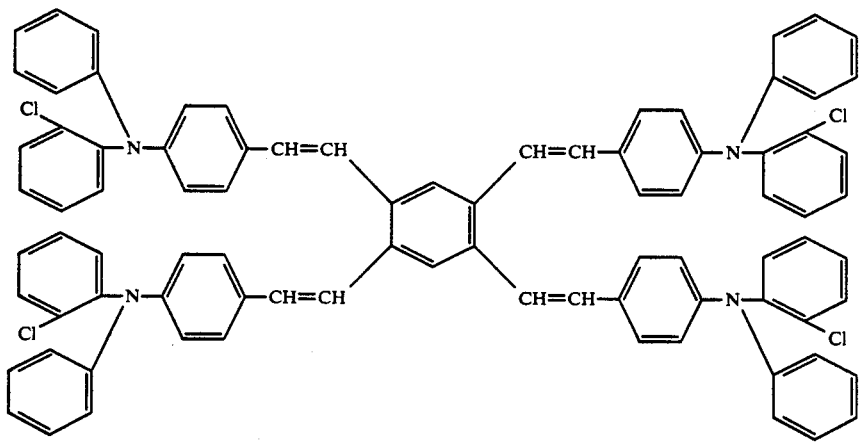
(6)
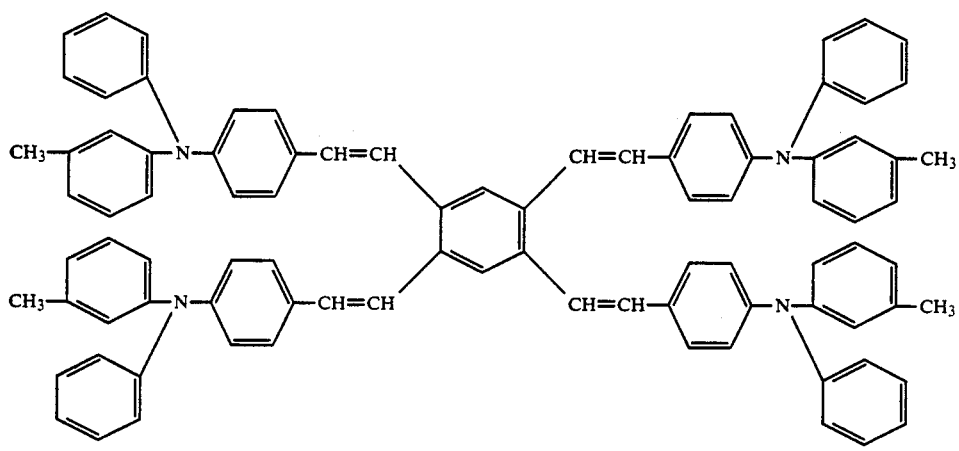
(7)
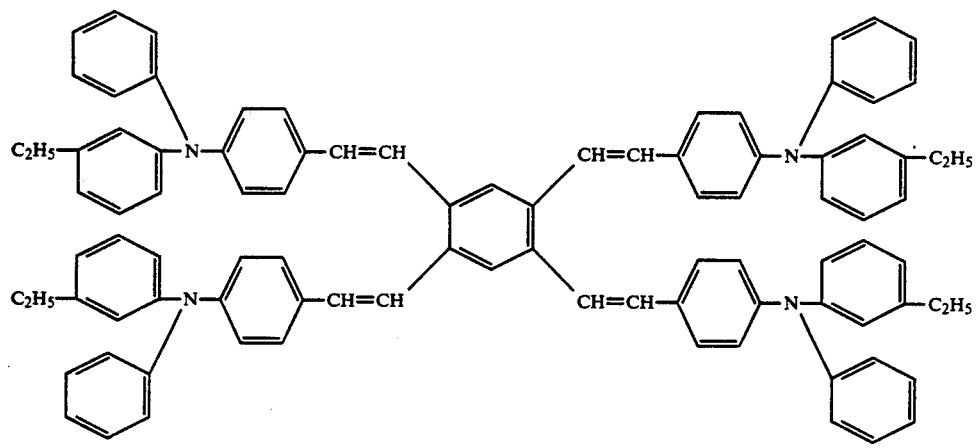
(8)

-continued
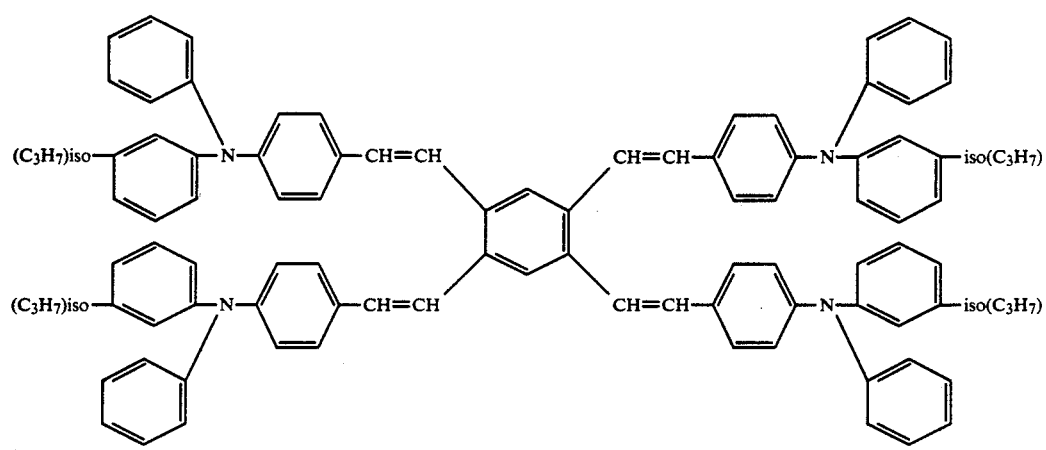
(9)
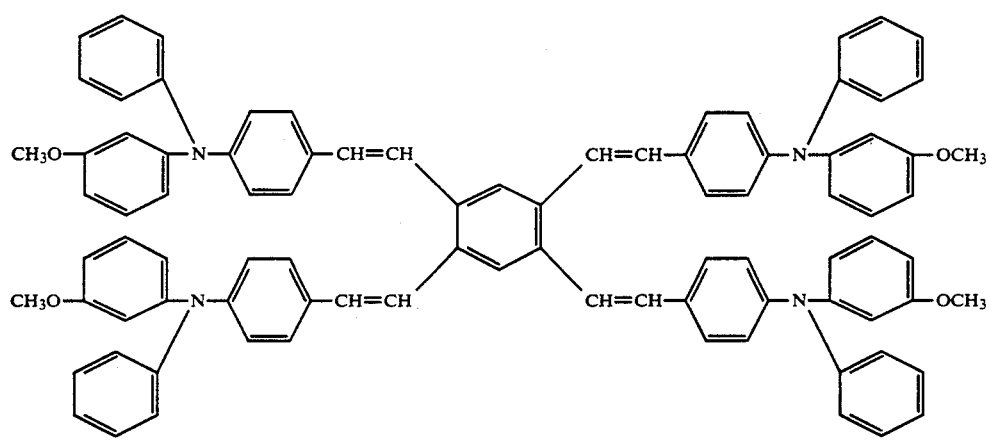
(10)
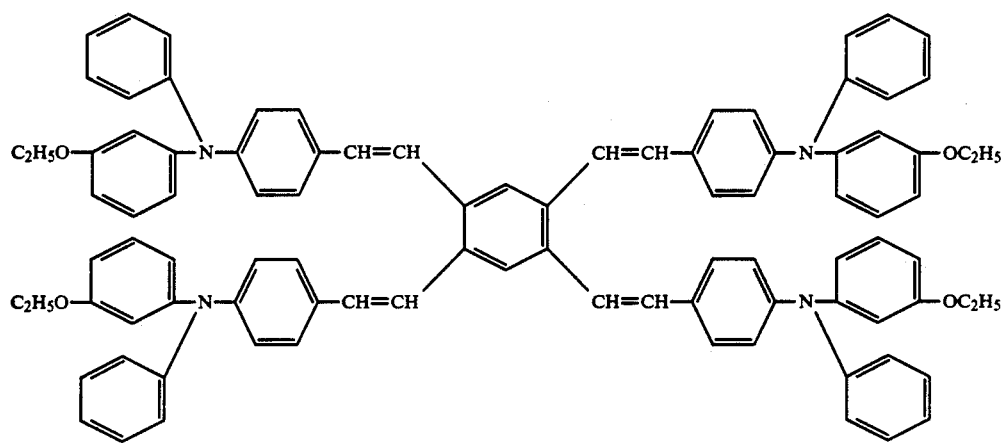
(11)

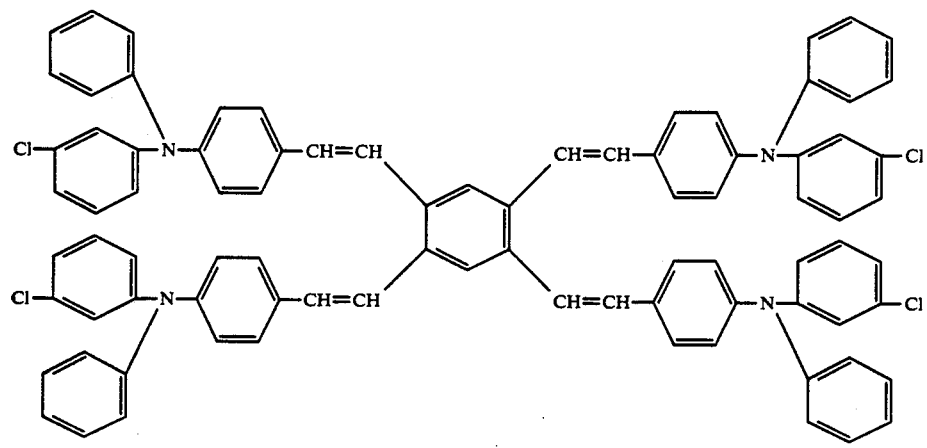
(12)
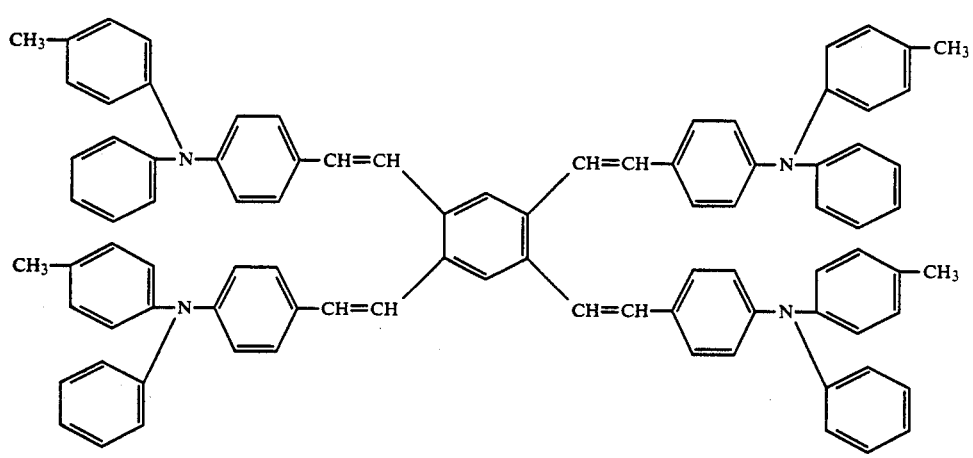
(13)
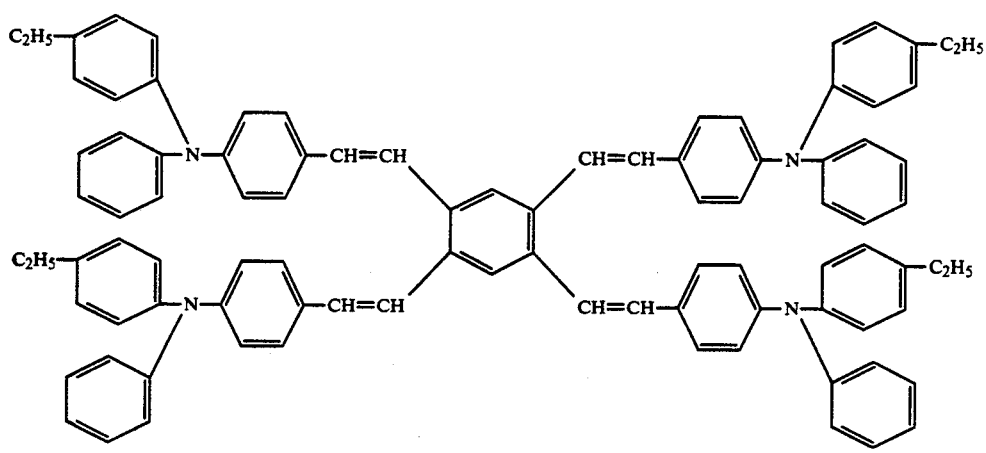
(14)

-continued
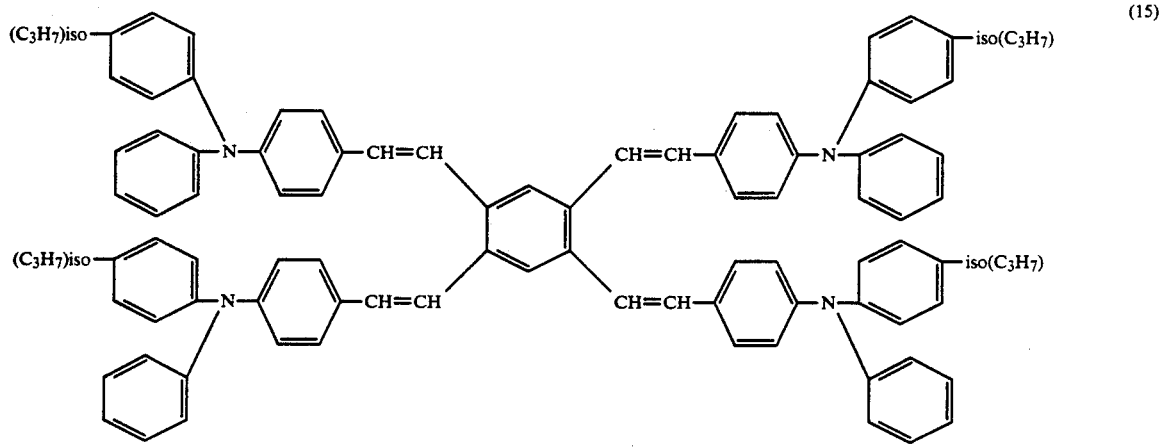
(15)
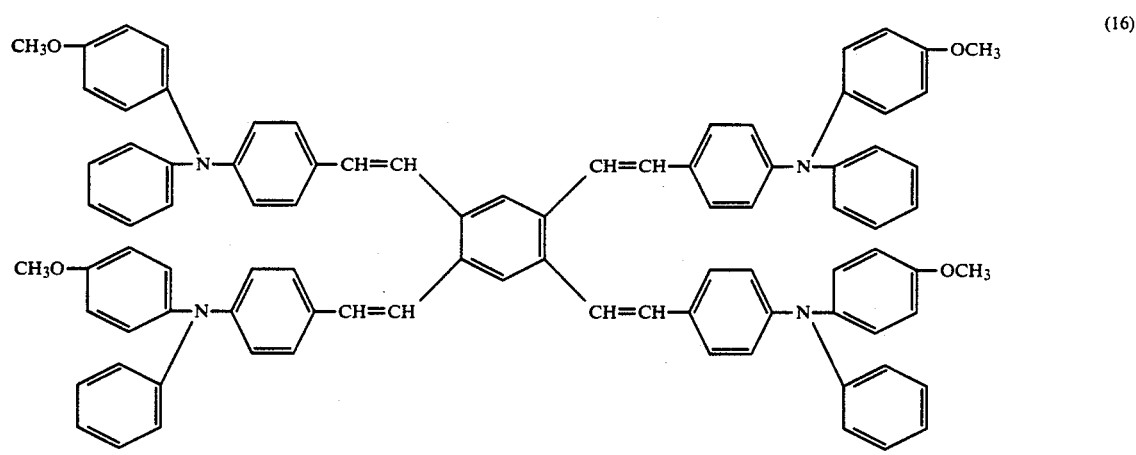
(16)
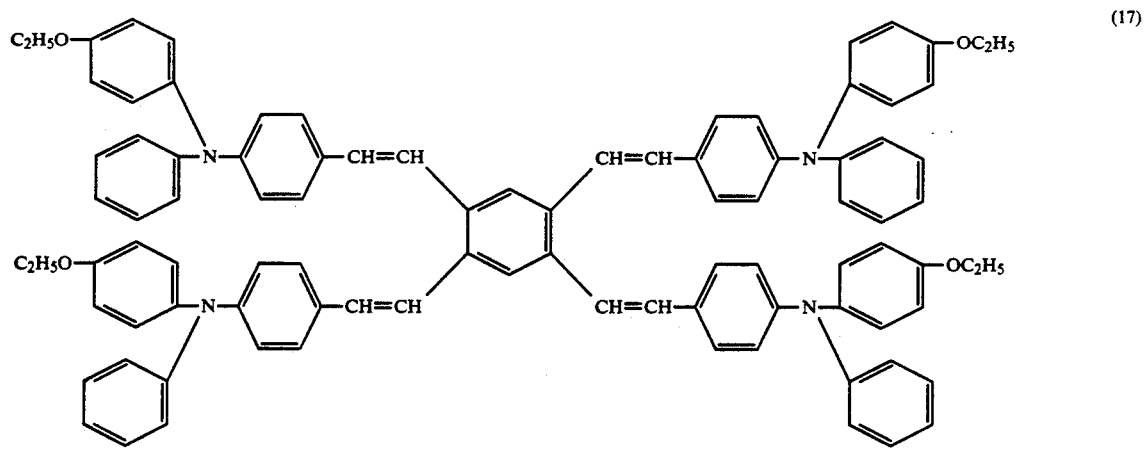
(17)

-continued
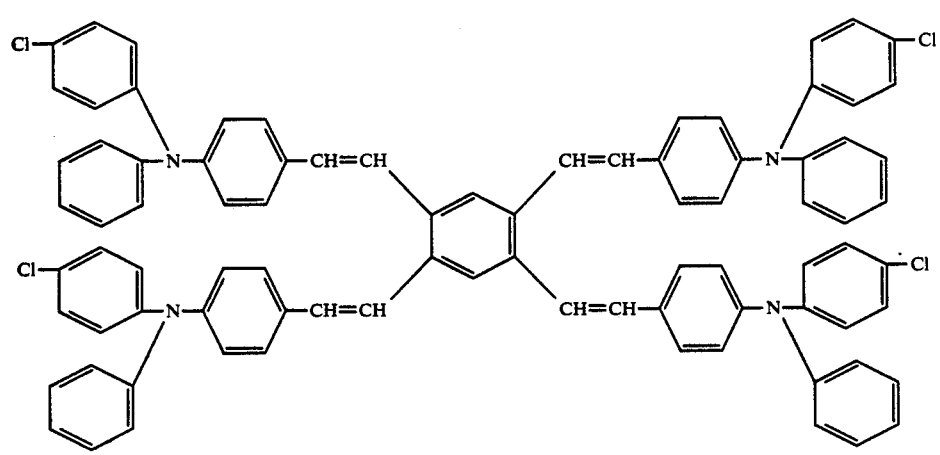
(18)
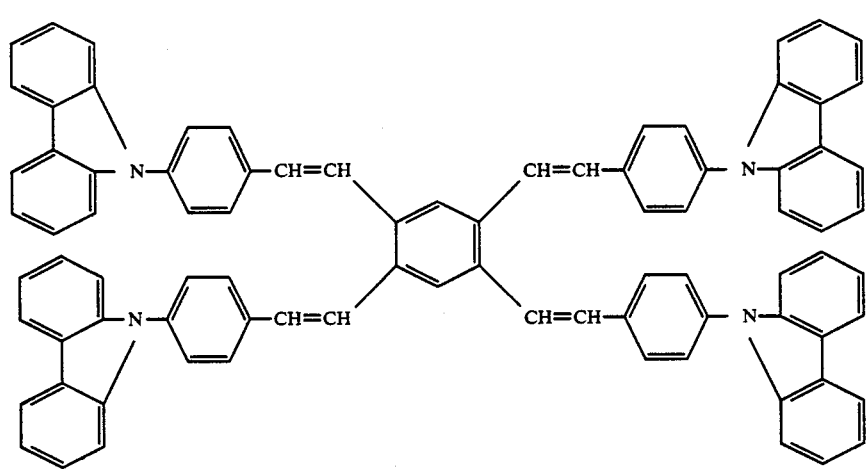
(19)
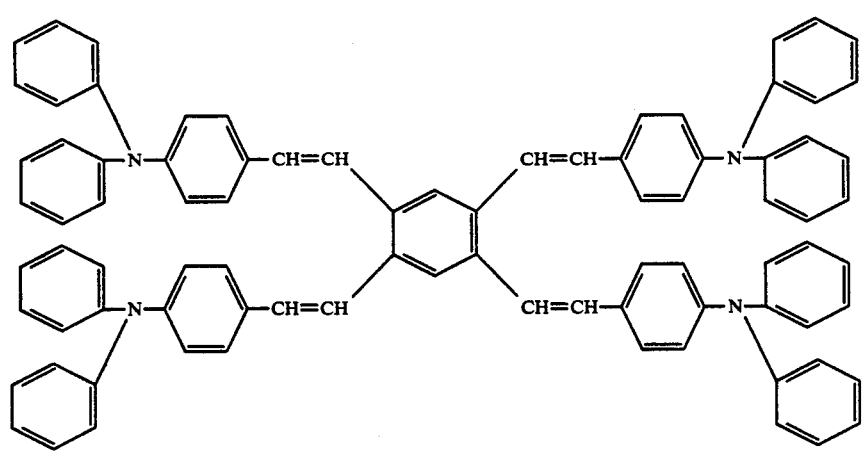
(20)

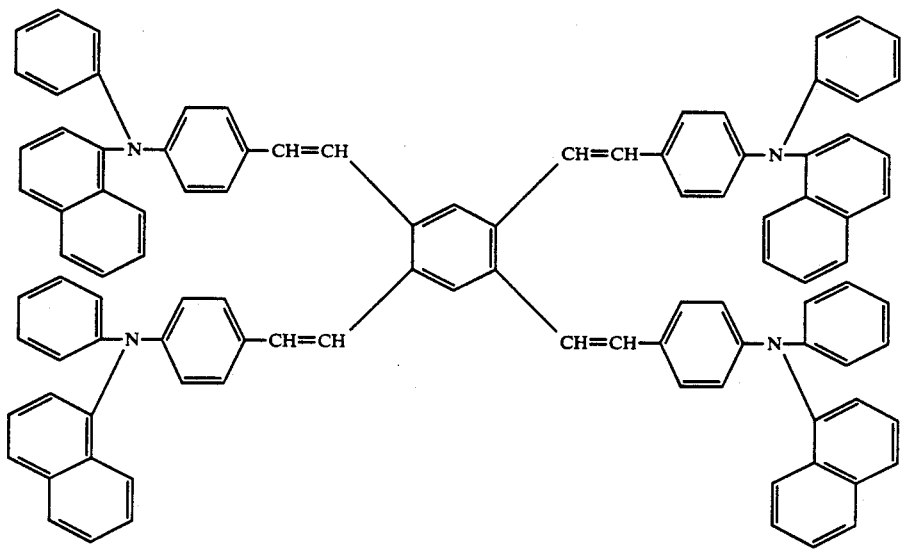
(21)
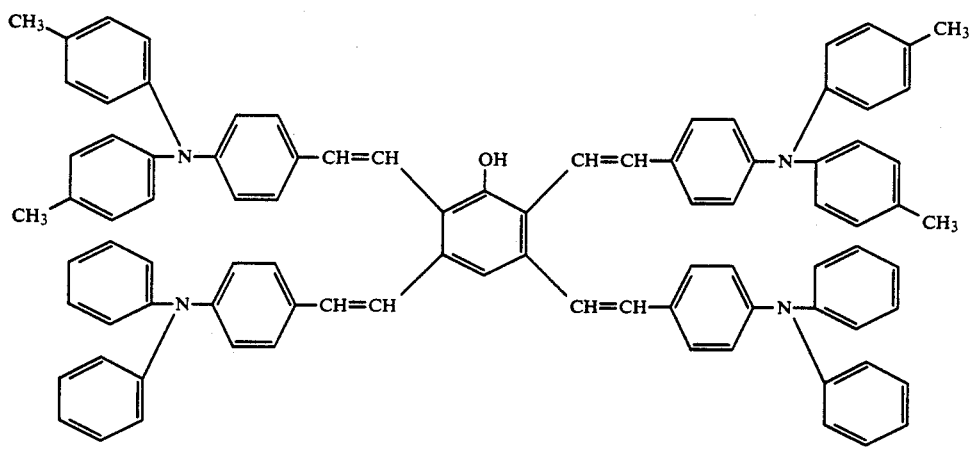
(22)
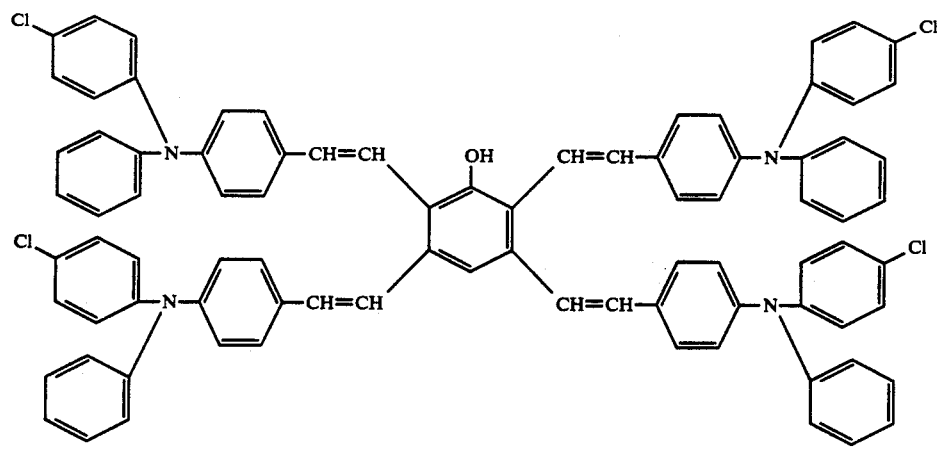
(23)

-continued
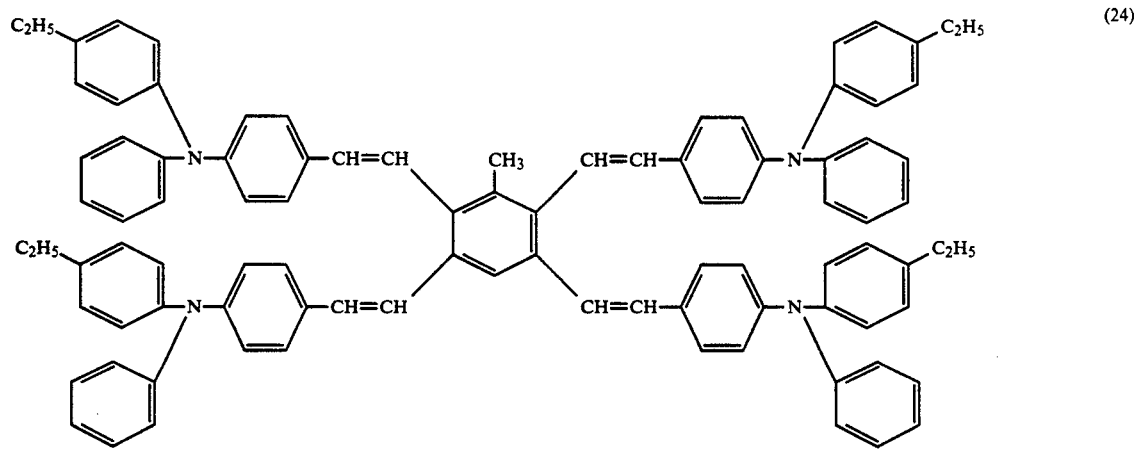
(24)
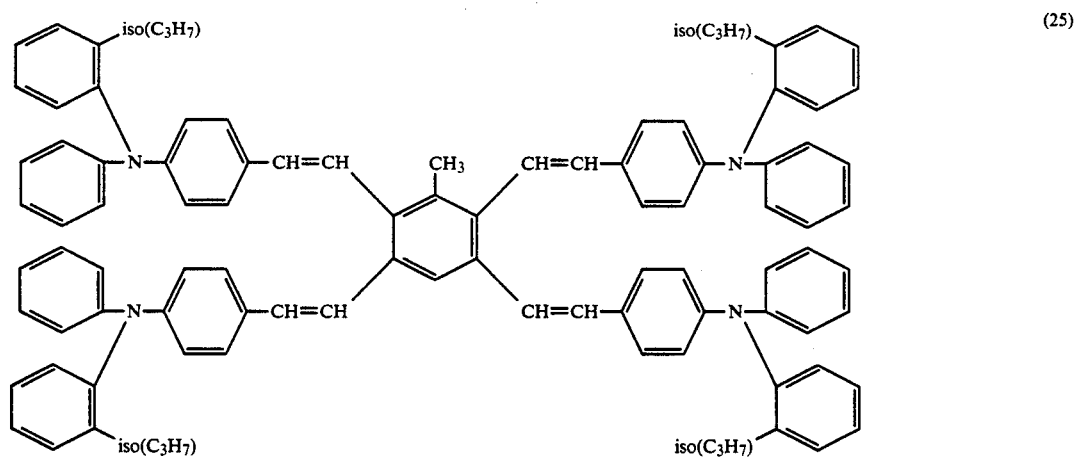
(25)
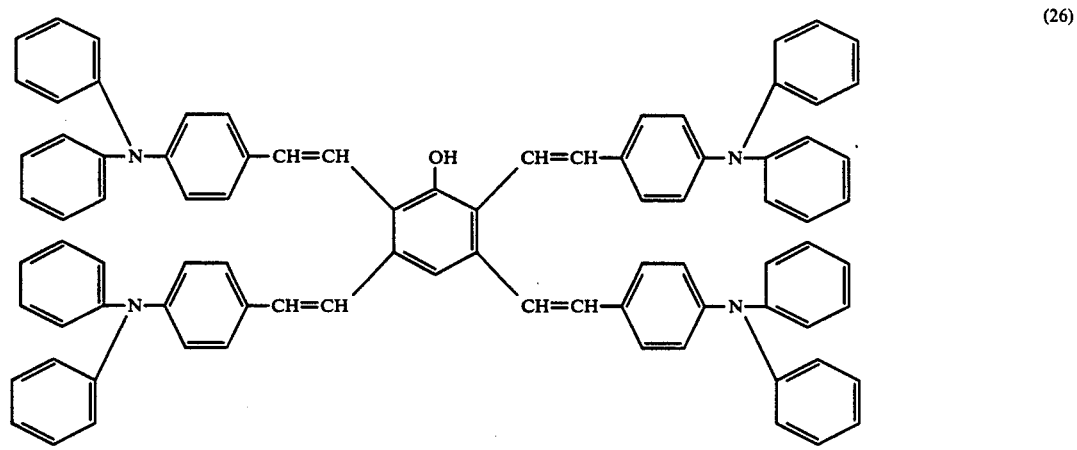
(26)

(27)
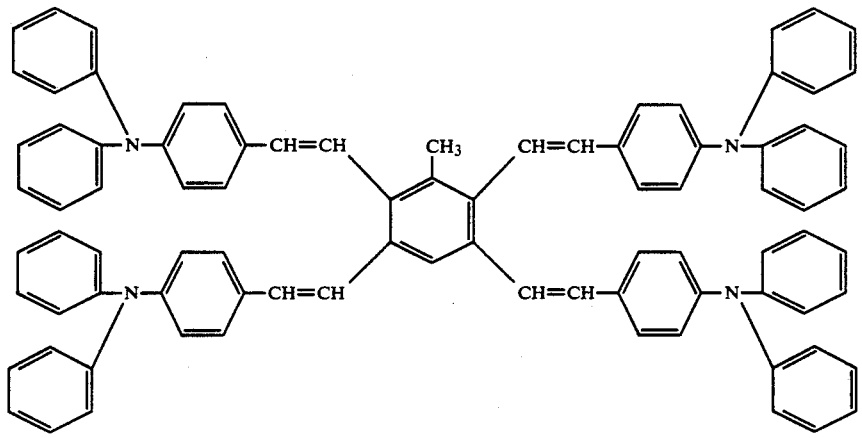
(28)
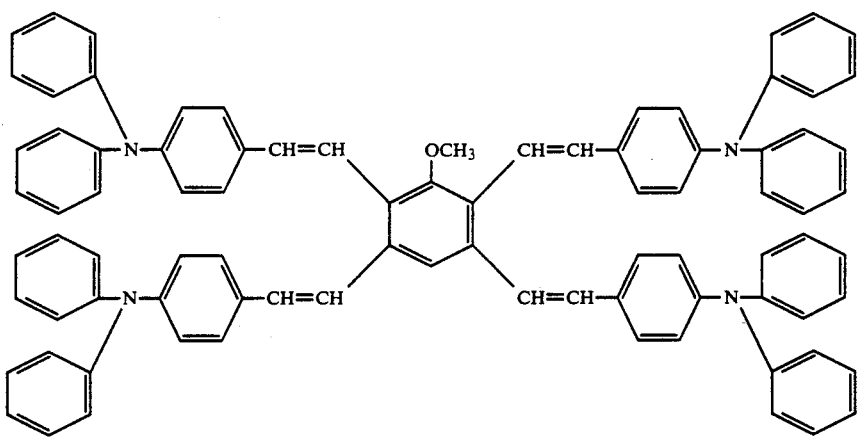
(29)
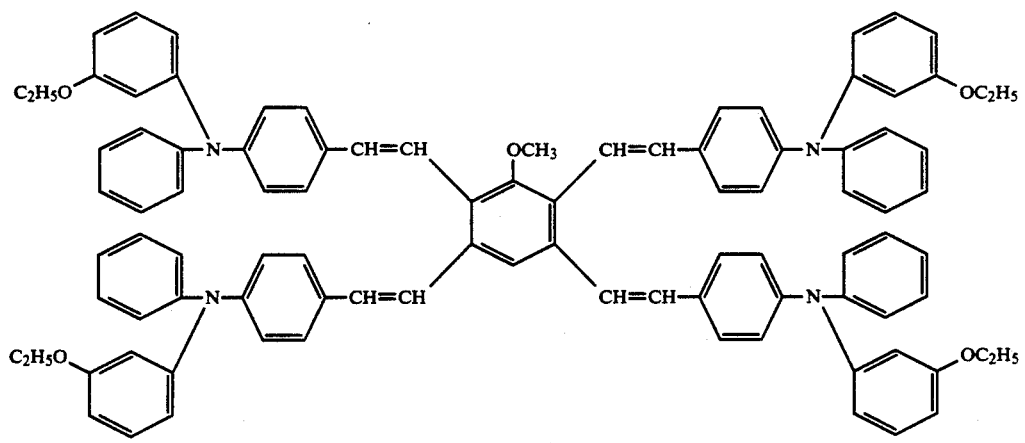

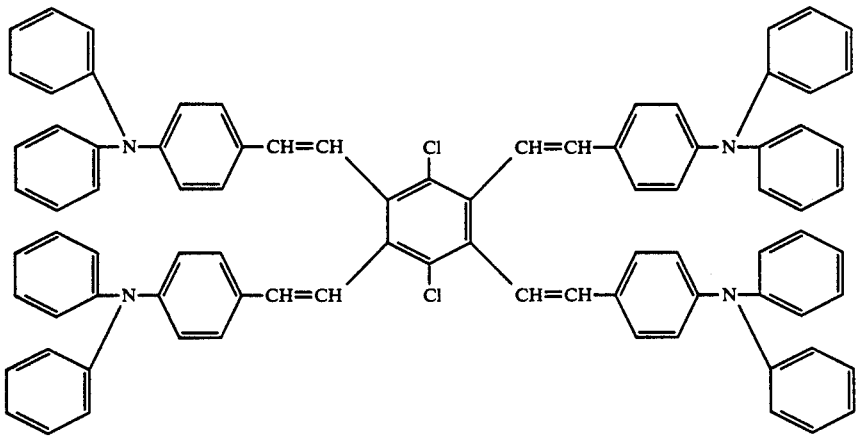
(30)
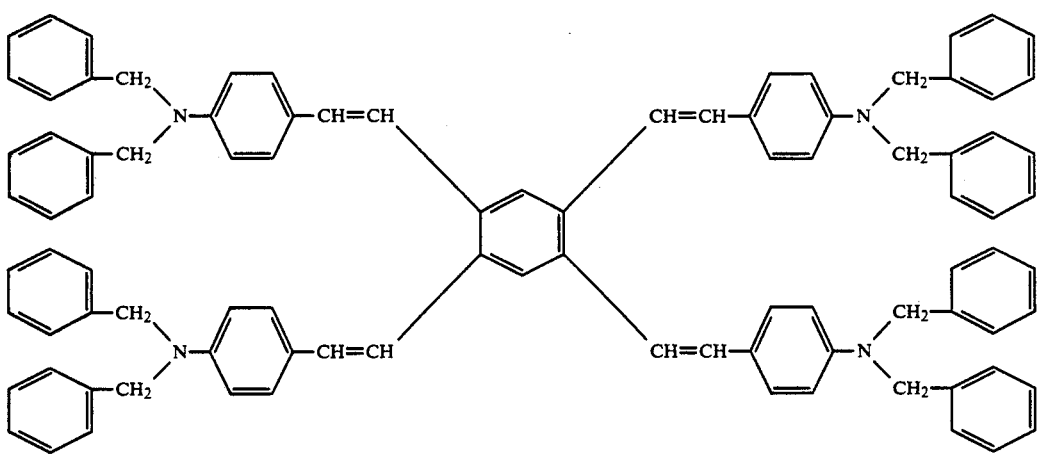
(31)
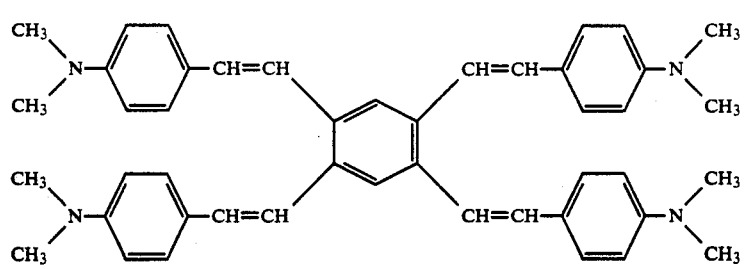
(32)
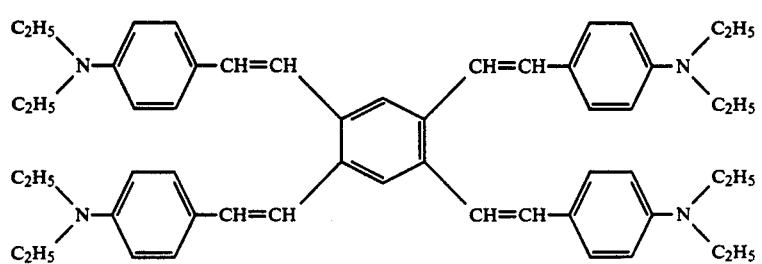
(33)

-continued
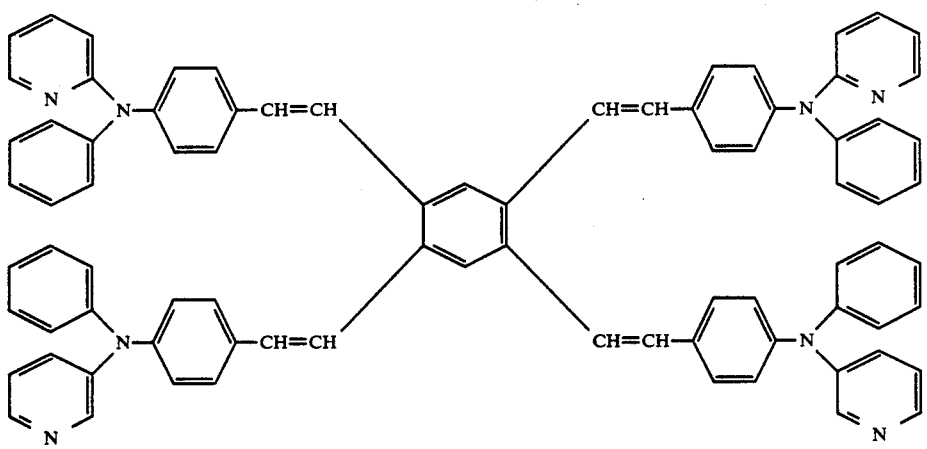
(34)
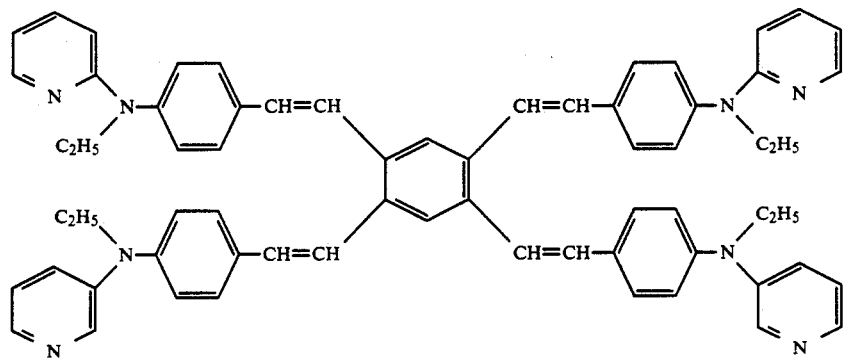
(35)
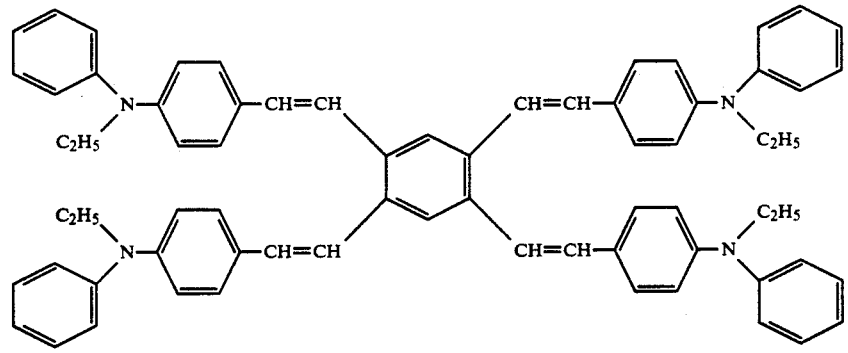
(36)
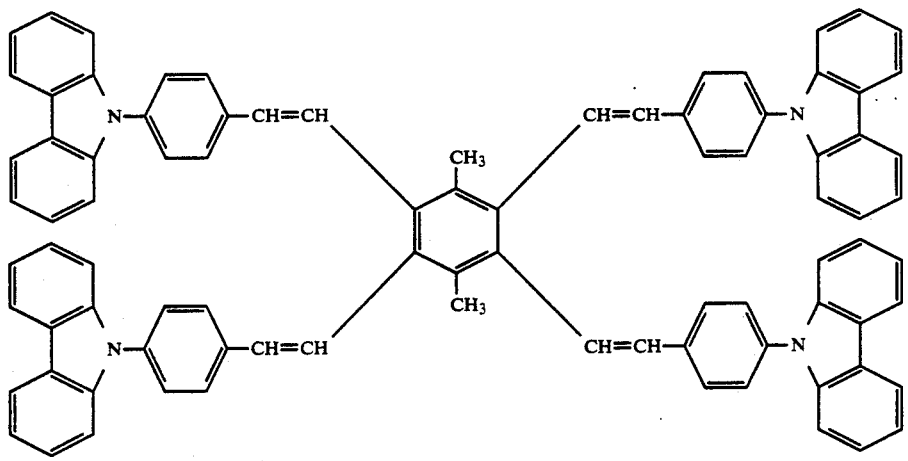
(37)

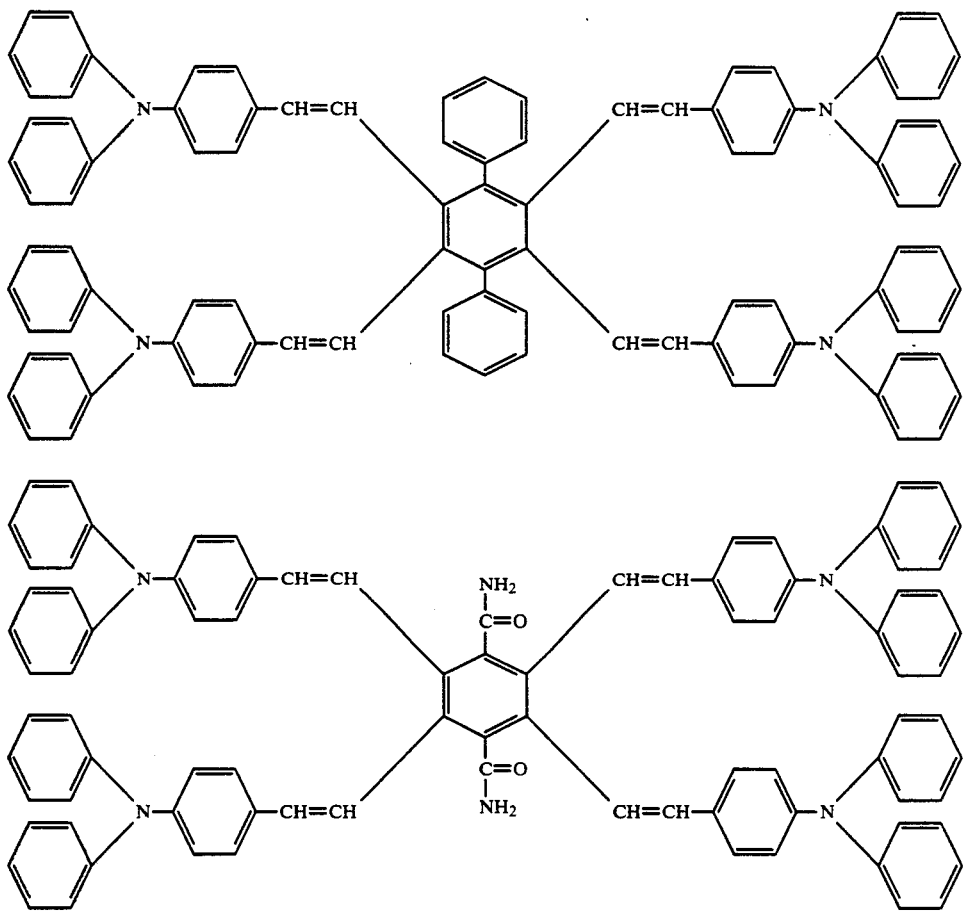

The synthesis of two compounds of the general formula (I) is illustrated below.

Synthesis of compound (3)

Potassium-t-butoxide (10.0 g) is dispersed in N,N-dimethyl-formamide (50 ml) at room temperature in a nitrogen atmosphere. To the dispersion, a mixture of 2-isopropyl-4'-formyltriphenyl-amine (10.0 g) and 1,2,4,5-tetraquis (diethyl methylphosphonate)-benzene (5.2 g) dissolved in N,N-dimethylformamide (50 ml) is added dropwise over a period of ca. 30 min. Thereafter, the mixture is stirred at room temperature for 3 h. The reaction solution is poured into water (500 ml) and subjected to extraction with toluene (200 ml). The organic layer is washed with water and the solvent is removed. By recrystallization with toluene-ethanol, the end compound is obtained in an amount of 9.3 g (yield=95%). m.p. 265°-269° C.

Synthesis of compound (21)

Potassium t-butoxide (5.0 g) is dispersed in toluene (50 ml) at room temperature in a nitrogen atmosphere. To the dispersion, a mixture of 1,2,4,5-tetraquis (diethyl methylphosphonate)-benzene (2.6 g) and 4-(N-phenyl-N-α-naphtnyl)aminobenzaldehyde (5.2 g) dissolved in toluene (50 ml) is added dropwise over a period of ca. 30 min. Thereafter, the mixture is stirred at room temperature for 3 h. The reaction solution is poured into water (500 ml) and subjected to extraction with toluene (200 ml). The organic layer is washed with water and the solvent is removed. By recrystallization with toluene-ethanol, the end compound is obtained in an amount of 4.1 g (yield=33%). m.p. 272°-276° C.

Figure 3:
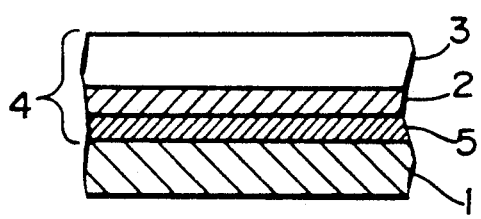
Figure 4:
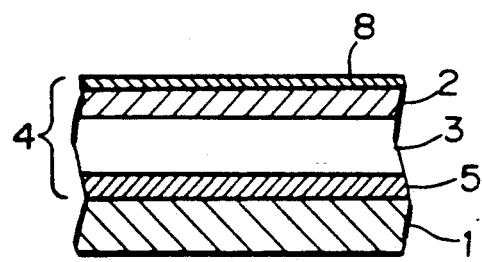
Figure 5:
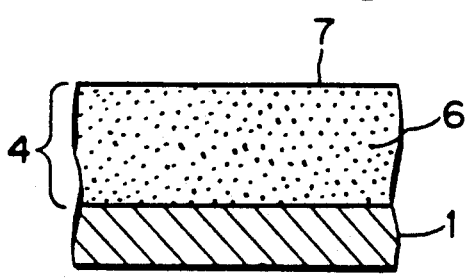
Figure 6:
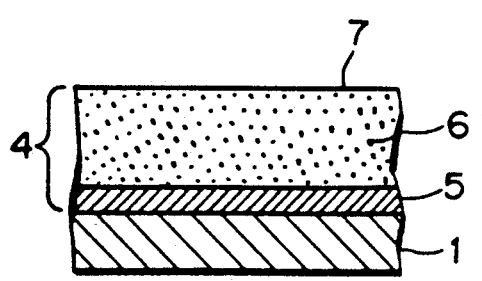

Various structural forms are known with respect to electrophotographic photoreceptors and any of them can be adopted by the electrophotographic photoreceptor of the present invention. Common structural forms are shown in FIGS. 1-6. The photoreceptor shown in each of FIGS. 1 and 2 comprises an electroconductive base 1 which has formed thereon a light-sensitive layer 4 comprising an assembly of a carrier generation layer 2 that contains a carrier generation material as a chief component and a carrier transport layer 3 that contains a carrier transport layer as a chief component. As shown in FIGS. 3 and 4, an intermediate layer 5 may be disposed between the light-sensitive layer 4 and the conductive base 1. By adopting such a dual structure in the light-sensitive layer 4, a photoreceptor having most desirable electrophotographic characteristics can be obtained. Other modifications of the photoreceptor of the present invention are shown in FIGS. 5 and 6. In the case shown in FIG. 5, a light-sensitive layer 4 having a carrier generation material 7 dispersed in a layer 6 that is based on a carrier transport material is formed directly on the conductive base 1. Alternatively, an intermediate layer 5 may be provided between said light-sensitive layer 4 and the conductive base 1 as shown in FIG. 6. If necessary, a protective layer 8 may be formed as the outermost layer as shown in FIG. 4.

The following compounds may be used as carrier generation materials in the light-sensitive layer, the carrier generation layer, etc:

(1) azo dyes such as monoazo dyes, disazo dyes and trisazo dyes;

(2) perylene dyes such as perylenic acid anhydride and perylenic acid imide;
(3) indigo dies such as indigo and thioindigo;
(4) polycyclic quinones such as anthraquinone, pyrenequinone and flavanthrone;
(5) quinacridone dyes;
(6) bisbenzimidazole dyes;
(7) indanthrene dyes;
(8) squarylium dyes;
(9) cyanine dyes;
(10) azulenium dyes;
(11) triphenylmethane dyes;
(12) amorphous silicon;
(13) phthalocyanine dyes such as metal phthalocyanine and metal-free phthalocyanine;
(14) selenium, selenium-tellurium, and selenium-arsenic;
(15) CdS and CaSe;
(16) pyrylium salt dyes and thiapyrylium salt dyes.

These dyes may be used either on their own or as admixtures.

The stilbene derivatives used in the present invention have no film forming capability by themselves and hence are combined with various binders to form a light-sensitive layer.

While any binders may be used in the present invention, it is preferred to use hydrophobic, high-dielectric constant, electrically insulating film-forming high-molecular weight polymers. Such high-molecular weight polymers include but are not limited to the following;

(P-1) polycarbonates;
(P-2) polyesters;
(P-3) methacrylic resins;
(P-4) acrylic resins;
(P-5) polyvinyl chloride;
(P-6) polyvinylidene chloride;
(P-7) polystyrene;
(P-8) polyvinyl acetate;
(P-9) styrene-butadiene copolymer;
(P-10) vinylidene chloride-acrylonitrile copolymer;
(P-11) vinyl chloride-vinyl acetate copolymer;
(P-12) vinyl chloride-vinyl acetate-maleic anhydride compolymer;
(P-13) silicone resins;
(P-14) silicone-alkyd resins;
(P-15) phenol-formaldehyde resin;
(P-16) styrene-alkyd resins:
(P-17) poly-N-vinylcarbazole;
(P-18) polyvinylbutyral; and
(P-19) polyvinylformal.

These binder resins may be used either on their own or as admixtures.

Solvents that can be used to form the carrier generation and transport layers of the photoreceptor of the present invention include; N,N-dimethylformamide, acetone, methyl ethyl ketone, cyclohexanone, benzene, toluene, xylene, chloroform, 1,2-dichloroethane, 1,2-dichloropropane, 1,1,2-trichloroethane, 1,1,1-trichloroethane, trichloroethylene, tetrachloroethane, dichloromethane, tetrahydrofuran, dioxane, methanol, ethanol, isopropanol, ethyl acetate, butyl acetate, dimethyl sulfoxide and methyl cellosolve. These solvents may be used either on their own or as admixtures.

If the light-sensitive layer in the photoreceptor of the present invention is of a multilayer structure, the weight ratio of the binder to carrier generation material to carrier transport material in the carrier generation layer is preferably in the range of (0-100):(1-500):(0-500). If the content of the carrier generation material is smaller than the lower limit shown above, photosensitivity will decrease whereas residual potential will increase. If the content of the carrier generation material is greater than the upper limit shown above, dark decay and acceptance potential will decrease.

The content of the carrier transport material is preferably in the range of 20-200 parts, more preferably 30-150 parts, by weight per 100 parts by weight of the binder resin in the carrier transport layer.

The carrier generation layer thus formed preferably has a thickness of 0.01-10 $\mu$m, with the range of 0.1-5 $\mu$m being particularly preferred.

The carrier transport layer preferably has a thickness of 5-50 $\mu$m, with the range or 5-30 $\mu$m being particularly preferred.

If the light-sensitive layer in the photoreceptor of the present invention is of a single-layered, functionally separated structure, the weight ratio of the binder to carrier generation material to carrier transport material in the light-sensitive layer is preferably in the range of (0-100):(1-500):(1-500). The light-sensitive layer preferably has a thickness of 5-50 $\mu$m, with the range of 5-30 $\mu$m being particularly preferred.

The conductive base support to be used in the photoreceptor of the present invention may be a metal (inclusive of alloys) plate, a metal drum or a thin conductive layer that is made of a conductive polymer, a conductive compound such as indium oxide or a metal (inclusive of alloys) such as aluminum, palladium or gold and which is coated, vapor-deposited, laminated or otherwise formed on a substrate such as paper or a plastic film in order to make them electrically conductive.

Binders that can be used in the intermediate layer and the protective layer include those used for above-mentioned carrier generation layer and carrier transport layer, as well as polyamide resin; nylon resin; ethylene resins such as ethylene-vinyl acetate copolymer, ethylenevinylacetate-maleic anhydride copolymer, ethylene-vinyl acetate-methacrylic acid copolymer; polyvinylalcohol; cellulose derivatives.

The light-sensitive layer in the photoreceptor of the present invention may have organic amines incorporated therein for the purpose of enhancing the function of the carrier generation material, and the addition of secondary amines is particularly preferred.

The light-sensitive layer may also contain an antideterioration agent such as an antioxidant or photostabilizer for the purpose of providing improved keeping quality, endurance and resistance to environmental factors. Exemplary compounds that are effective for this purpose include chromanol derivatives such as tocopherol and etherified or esterified compounds thereof, polyarylalkane compounds, hydroquinone derivatives and mono- or di-etherified compounds thereof, benzophenone derivatives, benzotriazole derivatives, thioether compounds, phosphonic acid esters, phosphorous acid esters, phenylenediamine derivatives, phenol compounds, hindered phenol compounds, straight-chained amine compounds, cyclic amine compounds, and hindered amine compounds. Particularly effective compounds include hindered phenol compounds such as "IRGANOX 1010" and "IRGANOX 565" of Ciba - Geigy AG., and "SUMILIZER BHT" and "SUMILIZER MDP" of Sumitomo Chemical Co., Ltd., and "SANOL LS-2626" and "SANOL LS-622LD" of Sankyo Co., Ltd.

In order to improve sensitivity or reduce residual potential or fatigue due to cyclic use, the carrier generation layer in the photoreceptor of the present invention may contain one or more electron-accepting materials. Useful electron-accepting materials are selected from among the following compounds having high electron affinity; succinic anhydride, maleic anhydride, dibromosuccinic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitrile, picryl choride, quinone chlorimide, chloranil, bromanil, dichlorodicyano-p-benzoquinone, anthraquinone, dinitroanthraquinone, 2,7-dinitrofluorenone, 2,4,7-trinitrofluorenone, 2,4,5,7-tetranitrofluorenone, 9-fluorenylidene(malonodinitrile), polynitro-9-fluorenylidene-(malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid, and mellitic acid.

These electron-accepting materials are used in such amounts that the weight ratio of carrier generation material to electron-accepting material is in the range of from 100:0.01 to 100:200, preferably from 100:0.1 to 100:100.

The electron-accepting materials may also be incorporated in the carrier transport layer. In this case, they are used in such amounts that the weight ratio of carrier transport material to electron-accepting material is in the range of from 100:0.01 to 100:100, preferably from 100:0.1 to 100:50.

If necessary, the photoreceptor of the present invention may contain additives such as an ultraviolet absorber in order to protect the light-sensitive layer. It may also contain dyes capable of color sensitivity correction.

Having the constitution described above, the electrophotographic photoreceptor of the present invention is improved not only in charging, sensitivity and image forming characteristics but in endurance (i.e., less deterioration due to fatigue in cyclic use), as will be apparent from the examples to be described below.

The electrophotographic photoreceptor of the present invention is applicable not only to electrophotographic copiers but also to other apparatus such as printers using a laser, CRT or LED as a light source.

The following examples are provided for the purpose of further illustrating the present invention but are in no way to be taken as limiting.

EXAMPLE 1

An electroconductive base support having aluminum evaporated on a polyester film was coated with an intermediate layer 0.05 μm thick that was made of a vinyl chloride-vinyl acetate-maleic acid copolymer ("ES-lec MF-10" of Sekisui Chemical Co., Ltd.) In the next step, 1 g of dibromoanthanthrone ("Monolite Red 2Y" of ICI Ltd.; C.I. No. 59300) was added to 30 ml of 1,2-dichloroethane and dispersed by means of a ball mill. In the resulting dispersion, 1.5 g of a polycarbonate ("Panlite L-1250" of Teijin Chemicals Ltd.) was dissolved and mixed well to prepare a coating solution, which was applied onto the intermediate layer to form a carrier generation layer in a dry thickness of 2 μm.

Subsequently, 5 g of compound (1) and 10 g of a polycarbonate ("Z-200" of Mitsubishi Gas Chemical Co., Inc.) were dissolved in 80 ml of tetrahydrofuran and the resulting solution was coated onto the carrier generation layer to form a carrier transport layer in a dry thickness of 20 μm.

The characteristics of the thus fabricated photoreceptor were evaluated by the following method with a paper analyzer Model EPA-8100 of Kawaguchi Electric Works Co., Ltd. The photoreceptor was charged at a negative voltage of 6 kV for 5 sec and left in the dark for 5 sec. Thereafter, the photoreceptor was illuminated under a halogen lamp to give a light intensity of 2 lux on the surface and the initial surface potential $V_A$ and the half-decay exposure $E1/2$ were measured. Also measured was the residual potential $V_R$ that remained after exposure of 30 lux·sec. Similar measurements were repeated by 1,000 times. The results were as shown in Table 1.

TABLE 1

|  | Initial | | | After 1,000 cycles | | |
| --- | --- | --- | --- | --- | --- | --- |
|  | (V) $-V_A$ | (lux · sec) $E\frac{1}{2}$ | (V) $-V_R$ | (V) $-V_A$ | (lux · sec) $E\frac{1}{2}$ | (V) $-V_R$ |
| Example 1 | 1020 | 1.5 | 0 | 1010 | 1.6 | 0 |

EXAMPLE 2-13

Additional photoreceptors were fabricated by repeating the procedure of Example 1 except that compound (1) was replaced by the compounds shown in Table 2. The results of measurements conducted on these samples in the same manner as in Example 1 are also shown in Table 2.

TABLE 2

| Example No. | Compound No. | Initial | | | After 1,000 cycles | | |
| --- | --- | --- | --- | --- | --- | --- | --- |
|  |  | (V) $-V_A$ | (lux · sec) $E\frac{1}{2}$ | (V) $-V_R$ | (V) $-V_A$ | (lux · sec) $E\frac{1}{2}$ | (V) $-V_R$ |
| 2 | 2 | 1130 | 1.6 | 0 | 1120 | 1.7 | 0 |
| 3 | 3 | 1200 | 1.7 | 0 | 1180 | 1.7 | 0 |
| 4 | 4 | 1090 | 1.7 | 0 | 1085 | 1.8 | 0 |
| 5 | 7 | 1070 | 1.5 | 0 | 1060 | 1.6 | 0 |
| 6 | 8 | 1120 | 1.6 | 0 | 1100 | 1.7 | 0 |
| 7 | 9 | 1210 | 1.8 | 0 | 1210 | 1.8 | 0 |
| 8 | 10 | 1070 | 1.5 | 0 | 1055 | 1.6 | 0 |
| 9 | 13 | 1010 | 1.4 | 0 | 1000 | 1.6 | 0 |
| 10 | 15 | 1100 | 1.6 | 0 | 1090 | 1.7 | 0 |
| 11 | 37 | 1230 | 1.5 | 0 | 1210 | 1.5 | 0 |
| 12 | 38 | 1090 | 1.4 | 0 | 1082 | 1.5 | 0 |
| 13 | 39 | 1300 | 1.8 | 0 | 1290 | 2.0 | 0 |

COMPARATIVE EXAMPLES 1

A comparative photoreceptor was fabricated as in Example 1 except that the compound shown below was used as a carrier transport material;

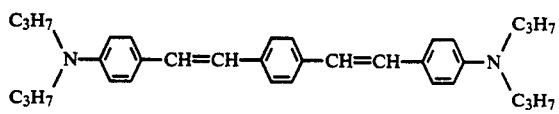

The characteristics of this comparative photoreceptor were evaluated as in Example 1 and the results were as shown in Table 3.

TABLE 3

| | Initial | | | After 1,000 cycles | | |
|---|---|---|---|---|---|---|
| | (V) $-V_A$ | (lux·sec) $E_{\frac{1}{2}}$ | (V) $-V_R$ | (V) $-V_A$ | (lux·sec) $E_{\frac{1}{2}}$ | (V) $-V_R$ |
| Comparative Example 1 | 930 | 2.0 | 0 | 880 | 2.3 | 21 |

EXAMPLE 14

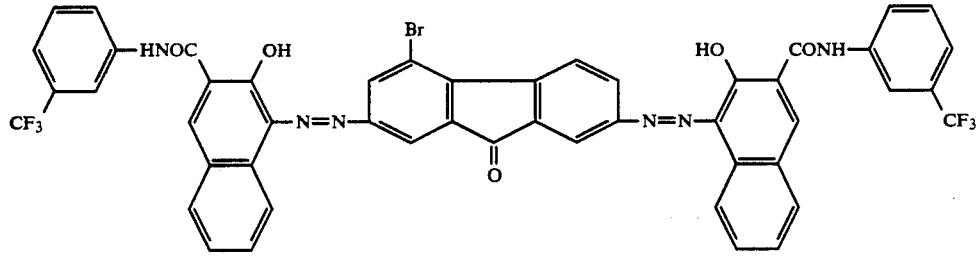

Two grams of the bisazo pigment having the structure shown above and 2 g of a polycarbonate resin "Panlite L-1250" were mixed in 100 ml of 1,2-dichloroethane and dispersed with a sand grainder for 8 h. The resulting dispersion was applied onto a conductive base support having aluminum evaporated on a polyester film. The so formed carrier generation layer had a dry thickness of 0.2 μm.

Using compound (3) as a carrier transport material, a carrier transport layer was formed as in Example 1 except that an antioxidant "IRGANOX 1010" was added in an amount of 2% of the carrier transport material. The thus fabricated photoreceptor was subjected to the same measurements as in Example 1 and the results were as shown in Table 4.

TABLE 4

| | Initial | | | After 1,000 cycles | | |
|---|---|---|---|---|---|---|
| | (V) $-V_A$ | (lux·sec) $E_{\frac{1}{2}}$ | (V) $-V_R$ | (V) $-V_A$ | (lux·sec) $E_{\frac{1}{2}}$ | (V) $-V_R$ |
| Example 14 | 1370 | 0.8 | 0 | 1350 | 0.9 | 0 |

EXAMPLE 15 to 26

Additional photoreceptors were fabricated by repeating the procedure of Example 14 except that compound (3) was replaced by the compounds shown in Table 5. The results of measurements conducted on these samples in the same manner as in Example 14 are also shown in Table 5.

TABLE 5

| Example No. | Compound No. | Initial | | | After 1,000 cycles | | |
|---|---|---|---|---|---|---|---|
| | | (V) $-V_A$ | (lux·sec) $E_{\frac{1}{2}}$ | (V) $-V_R$ | (V) $-V_A$ | (lux·sec) $E_{\frac{1}{2}}$ | (V) $-V_R$ |
| 15 | 2 | 1390 | 0.9 | 0 | 1370 | 1.0 | 0 |
| 16 | 3 | 1400 | 0.8 | 0 | 1380 | 0.9 | 0 |
| 17 | 4 | 1370 | 0.8 | 0 | 1360 | 0.9 | 0 |
| 18 | 7 | 1320 | 0.9 | 0 | 1310 | 0.9 | 0 |
| 19 | 8 | 1350 | 0.9 | 0 | 1350 | 1.0 | 0 |
| 20 | 9 | 1410 | 0.8 | 0 | 1400 | 1.0 | 0 |
| 21 | 10 | 1380 | 0.9 | 0 | 1370 | 0.9 | 0 |
| 22 | 13 | 1410 | 0.9 | 0 | 1390 | 0.9 | 0 |
| 23 | 15 | 1390 | 0.8 | 0 | 1370 | 1.0 | 0 |
| 24 | 37 | 1390 | 0.8 | 0 | 1385 | 0.9 | 0 |
| 25 | 38 | 1340 | 0.9 | 0 | 1330 | 0.8 | 0 |
| 26 | 39 | 1500 | 1.0 | 0 | 1480 | 1.1 | 0 |

COMPARATIVE EXAMPLE 2

An additional comparative photoreceptor was fabricated as in Example 14 except that the compounds shown below was used as a carrier transport material: Comparative Example 3:

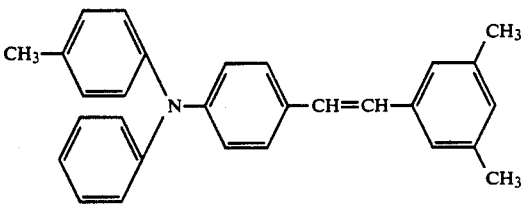

The characteristics of the comparative photoreceptor were evaluated as in Example 1 and the results were as shown in Table 6.

TABLE 6

| | Initial | | | After 1,000 cycles | | |
|---|---|---|---|---|---|---|
| | (V) $-V_A$ | (lux·sec) $E_{\frac{1}{2}}$ | (V) $-V_R$ | (V) $-V_A$ | (lux·sec) $E_{\frac{1}{2}}$ | (V) $-V_R$ |
| Comparative Example 2 | 920 | 2.0 | 0 | 810 | 2.3 | 15 |

EXAMPLE 27

A solution having one part of compound (1), i.e., a carrier transport material of the present invention, and 1.5 parts of a polyester resin "Vylon 200" (product of Toyobo Co., Ltd.) dissolved in 10 parts of 1,2-dichloroethane was dip-coated onto an aluminum drum and dried to form a carrier transport layer 15 μm thick. In a separate step, one part of titanyl phthalocyanine (i.e., carrier generation material) having the crystallographic form described in JP-A-64-17065 and 3 parts of a polycarbonate "Panlite L-1250" (binder resin produced by Teijin Chemicals Ltd.) were dispersed in 15 parts of monochlorobenzene and 35 parts of 1,2-dichloroethane (both being used as dispersion media) by means of a ball mill. Further, compound (1) was added as a carrier transport material in an amount of 75 wt. % of the binder resin. The so prepared dispersion was spray-coated onto the previously formed carrier transport layer to form a carrier generation layer in a thickness of 2 μm.

The photoreceptor thus fabricated was evaluated as in Example 1 except that it was charged at a positive voltage of 6 kV. The results were as follows: Va=1450 V, and E1/2 =0.8 lux·sec.

EXAMPLE 28

An intermediate layer 0.1 μm thick was formed of a vinyl chloride-vinyl acetate-maleic anhydride copolymer, "ES-lec MF-10" of Sekisui Chemical Co., Ltd., on an aluminum drum. In a separate step, one part of dibromoanthanthrone "Monolite Red 2Y" (carrier generation material) was pulverized with a ball mill and dispersed with 3 parts of a polycarbonate resin "Panlite L-1250" in a mixture of monochlorobenzene (15 parts) and 1,2-dichloroethane (35 parts). To the resulting dispersion, 2 parts of compound (1) was added as a carrier transport material of the present invention, and the mixture was spray-coated onto the previously formed intermediate layer and dried to form a light-sensitive layer in a thickness of 20 μm.

The photoreceptor thus fabricated was evaluated as in Example 1 except that it was charged at a positive voltage of 6 kV. The results were as follows: Va=1085 V, and E1/2 =1.7 lux·sec.

What is claimed is:

1. An electrophotographic photoreceptor having a layer that contain at least one compound represented by the following general formula (I):

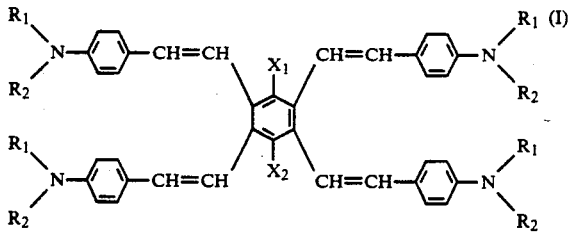

where $R_1$ and $R_2$ each represents an optionally substituted alkyl, aralkyl, aryl or heterocyclic group, provided that $R_1$ and $R_2$ may combine to form a cyclic amino group containing a nitrogen atom; $X_1$ and $X_2$ each represents a hydrogen atom, a hydroxyl group, a lower alkyl group having 1-5 carbon atoms, a lower alkoxy group having 1-5 carbon atoms, a halogen atom, an allyl group, an aryl group or an acylamino group.

2. An electrophotographic photoreceptor according to claim 1 which has a light-sensitive layer comprising an assembly of a carrier generation layer containing a carrier generation material and a carrier transport layer containing a carrier transport material.

3. An electrophotographic photoreceptor according to claim 2 wherein the carrier transport layer contains the compound represented by the general formula (I).

4. An electrophotographic photoreceptor according to claim 2 wherein the carrier transport material is contained in an amount of 20-200 wt. % of a binder resin in the carrier transport layer.

5. An electrophotographic photoreceptor according to claim 2 wherein the carrier transport layer has a thickness of 5-50 μm.

6. An electrophotographic photoreceptor according to claim 2 wherein the weight ratio of the binder to carrier generation material to carrier transport material in the carrier generation layer is (0-100):(1-500):(0-500).

7. An electrophotographic photoreceptor according to claim 2 wherein the carrier generation layer has a thickness of 0.01-10 μm.

8. An electrophotographic photoreceptor according to claim 1 wherein a carrier generation material is dispersed in a layer containing a carrier transport material.

9. An electrophotographic photoreceptor according to claim 8 wherein the layer containing the compound represented by the general formula (I) is a light-sensitive layer.

10. An electrophotographic photoreceptor according to claim 8 wherein the weight ratio of the binder to carrier generation material to carrier transport material in the light-sensitive layer is (0-100):(1-500):(1-500).

11. An electrophotographic photoreceptor according to claim 8 wherein the light-sensitive layer has a thickness of 5-50 μm.

12. An electrophotographic photoreceptor according to claim 1 which has a light-sensitive layer containing a binder composed of a high-dielectric constant, hydrophobic and electrically insulating film-forming high-molecular weight polymer.

13. An electrophotographic photoreceptor according to claim 1 which has a light-sensitive layer containing an anti-deterioration agent.

14. An electrophotographic photoreceptor according to claim 12 wherein the anti-deterioration agent is a hindered phenolic compound or a hindered amine compound.

15. An electrophotographic photoreceptor according to claim 1 which has a carrier generation layer containing at least one electron-accepting material.

* * * * *